US011225426B2

(12) United States Patent
Christy

(10) Patent No.: US 11,225,426 B2
(45) Date of Patent: Jan. 18, 2022

(54) FLUIDIZED BED PELLET REACTOR WATER SOFTENER AND PROCESS FOR SOFTENING WATER

(71) Applicant: RDP Technologies, Inc., Conshohocken, PA (US)

(72) Inventor: Richard W. Christy, Wayne, PA (US)

(73) Assignee: RDP Technologies, Inc., Conshohocken, PA (US)

( * ) Notice: Subject to any disclaimer, the term of this patent is extended or adjusted under 35 U.S.C. 154(b) by 0 days.

(21) Appl. No.: 16/299,980

(22) Filed: Mar. 12, 2019

(65) Prior Publication Data
US 2020/0290909 A1    Sep. 17, 2020

(51) Int. Cl.
*C02F 1/52*    (2006.01)
*C02F 5/02*    (2006.01)

(52) U.S. Cl.
CPC .............. *C02F 5/02* (2013.01); *C02F 1/5236* (2013.01); *C02F 1/5281* (2013.01); *C02F 2001/5218* (2013.01); *C02F 2209/40* (2013.01); *C02F 2209/42* (2013.01); *C02F 2303/16* (2013.01)

(58) Field of Classification Search
CPC .................. C02F 1/5236; C02F 1/5281; C02F 2001/5218; C02F 2209/40; C02F 2209/42; C02F 2303/16; C02F 5/02; C02F 3/085; C02F 3/2833; B01D 2009/0086; B01D 9/0036
See application file for complete search history.

(56) References Cited

U.S. PATENT DOCUMENTS

| 4,618,418 | A | * | 10/1986 | Heijnen | ................ C02F 3/2806 |
|---|---|---|---|---|---|
| | | | | | 210/151 |
| 6,698,766 | B2 | | 3/2004 | Simon | |
| 7,669,348 | B2 | | 3/2010 | Christy et al. | |
| 8,043,501 | B2 | | 10/2011 | Maloum et al. | |
| 8,682,477 | B2 | | 3/2014 | Christy et al. | |
| 9,169,147 | B2 | | 10/2015 | Christy et al. | |
| 9,637,393 | B2 | | 5/2017 | Heidel et al. | |
| 2008/0274244 | A1 | * | 11/2008 | Taylor | ..................... B65B 5/101 |
| | | | | | 426/392 |

FOREIGN PATENT DOCUMENTS

DE    102006055670 A1    5/2008

OTHER PUBLICATIONS

Hu et al, Full-Scale Experimental Study of Groundwater Softening in a Circulating Pellet Fluidized Reactor, Int. J. Environ. Res. Public Health 2018, 15, 1592, pp. 1-11. (Year: 2018).*
S. Saelid, N.A. Jenssen, T. Lindstad, L. Kolbeinsen, Modelling, Identification and Control of a Fluidized Bed Reactor, IFAC Proceedings Volumes, vol. 12, Issue 8, 1979, pp. 907-916. (Year: 1979).*

(Continued)

*Primary Examiner* — Pranav N Patel
(74) *Attorney, Agent, or Firm* — Paul & Paul

(57) ABSTRACT

As pellets grow from seed/sand in a fluidized bed pellent reactor, the weight of the reactor is measured and the density of the contents of the reactor is calculated, and the input flow of untreated water, water treatement chemical, and seed/sand are adjusted to provide improved removal of water hardness while reducing fine particulates in the outflow of softened water from the reactor.

10 Claims, 3 Drawing Sheets

(56) References Cited

OTHER PUBLICATIONS

International Journal of Environmental Research and Public Health, Article: Full-Scale Experimental Study of Groundwater Softening in a Circulating Pellet Fluidized Reactor, 2018, Ruizhu Hu, Tinglin Huang, Aofan Zhi, and Zhangcheng Tang.

Veolia Water Solutions & Technologies, Actina, Reducing Water Hardness With Pellet Softening.

Procorp Enterprises LLC, Valencia Water Company Water Treatment Plant, Crystalactor Zero Liquid Discharge Water Softening.

Journal of Environmental Sciences, vol. 50, Dec. 2016, pp. 109-116, Water Softening by Induced Crystallization In Fluidized Bed, Yuefang Chen, Rong Fan, Danfeng An, Yujie Cheng, Hazel Tan.

The Ohio Journal of Science, vol. 51, No. 1, Jan. 1951, Advances in Waterworks Equipment and Practice in the Past Fifteen Years, Samuel Shenker.

* cited by examiner

FLUIDIZED BED PELLET REACTOR WATER SOFTENER AND PROCESS FOR SOFTENING WATER

BACKGROUND OF THE INVENTION

1. Field of the Invention

This invention relates to fluidized bed pellet reactors.

2. Brief Description of the Prior Art

Fluidized bed pellet reactors have been employed to soften hard water on a municipal scale in the Netherlands for over 40 years (also known as "Amsterdam" reactors), and approximately half the water supply there is currently softened using such reactors. In these reactors a fine sand ("garnets") is suspended in an upward flowing column of water to be treated, and a reagent (such as sodium hydroxide, or sodium carbonate) is added to supersaturate with calcium carbonate ($CaCO_3$). The calcium carbonate precipitates or crystallizes on the fine sand "seeds" forming pellets composed largely of solid calcium carbonate, which are periodically removed from the reactor. Treated water is removed from the top of the fluid column. The precipitation process is controlled by adjusting the flows of seed, input water, and reagent. The effects of pellet size, pH, height of the fluid bed, influent flow, and reflux ratio (ratio of the part of the effluent flow refluxed to influent flow), and influent flow on hardness removal have been studied. Typically, pellets reach about 1 mm to 2 mm and are discharged. Crystallization takes place largely in the bottom layer of the fluidized bed. Despite long experience and extensive study, $Ca^{++}$ and total hardness removal is not ensured in current reactors. Alternatives have been proposed to improve treatment, such as by circulating the pellets from the top to the bottom of the fluidized bed.

There are multiple problems with current fluidized bed pellet reactors employed as water softeners. For example, compaction of the fluidized bed leads to dead zones with resultant short-circuiting. Sometimes such compaction occurs to the point of settling enough seed product that the nozzles are covered and essentially "plugged". Further, the required high speed of the pump required to maintain the fluidized bed leads to premature wear on the pump and abrasion of the crystals with the obvious resultant increase in fines production. Another problem is the production of excessive fines in the effluent overflow which leads to downstream filter limitations. Specifications for the effluent typically have limits on effluent turbidity. Yet another issue is that the influent water feed rates vary which affects the fluidization of the bed. Current control schemes rely on pumps and timers to feed seed/sand into the Amsterdam fluidized bed reactor and also to "blown-down" the finished product. All the data is volumetric and the accuracy and value of the data would increase by adding weight to the formulas.

SUMMARY OF THE INVENTION

The present invention provides a method of growing crystals in a fluidized bed reactor that utilizes a weight based operating system and/or in conjunction with a volumetric operating system to achieve a bed of a known density. As the process continues, the weight of the bed will be indicated on a scale which is used to determine that rate of the crystal precipitation, knowing this rate improves operational efficiency and overall water quality. Previously the batches were fed volumetrically "blown-down" after a predetermined period of time.

In one aspect of the present invention, a seed/sand feed sub-system is provided. In this sub-system, a predetermined weight of seed/sand is fed into a predetermined weight or volume of water.

In another aspect, a pellet reactor is initially filled with water to determine a known weight without seed/sand. The pellet reactor is mounted on load cells such that the total weight can be monitored. When the seed/sand is loaded, the measured weight of the pellet reactor will increase. As the precipitative crystallization process proceeds, the weight of the pellet reactor will continue to increase. From the measured changes in weight the rate of increase can be calculated and subsequently optimize the efficiency of the reaction. As the bed builds, the density of the bed as well as any changes in density can be determined. A predetermined density is targeted for optimum benefits.

In another aspect of the present invention, the speed of the water flow pump can be adjusted to adjust the density of the bed alone or optionally in conjunction with an upper baffle. This will affect changes in the rise rate while at the same time reduce the speed of the pump. Wear is a function of square of the pump speed as is the rate of production of fines. An optimum rise rate is maintained to minimize the carry-over of fines into the effluent.

When the density of the bed reaches optimum condition, some of the seed/sand crystals is removed or blown-down to a storage hopper. The blown-down material is a combination of crystals and water. The water is preferably removed and drained away from the hopper. Preferably, the hopper is mounted on load cells to indicate how much weight is in the hopper. The subsequent loss in weight reflects the progress of the gravity dewatering of the pellets. Collectively the hoppers will also provide useful inventory management information and truck loading control options.

In one aspect the present invention provides a fluidized bed pellet reactor for softening hard water. In this aspect the reactor comprises a reactor tank for containing a fluidized bed of pellets; means for providing fine sand for use as crystallization seeds to the reactor tank; an inflow pump for pumping inflow fluid to be treated into the reactor tank to fluidize the bed of pellets; means for providing reagent to the reactor tank for adjusting the pH of the fluid in the reactor tank; means for withdrawing treated water as an effluent from the reactor tank; means for withdrawing pellets from the reactor tank; and means for measuring the weight of the reactor tank and the contents of the reactor tank.

In this aspect, the fluidized bed pellet reactor preferably further includes a baffle positioned at the top of the reactor tank for limiting the outflow of effluent from the reactor tank. Further, preferably the means for providing fine sand includes means for measuring the weight of the fine sand provided, for example, one or more load cells. In addition, preferably the means for providing reagent includes means for measuring the weight of the reagent provided, such as one or more load cells. Further, preferably the fluidized bed pellet reactor includes means for transporting pellets withdrawn from the reactor tank, such as a conveyor, to a means for storing the pellets, such as one or more storage silos. Preferably, the fluidized bed pellet reactor further includes means for adjusting the height of the fluidized bed, such as by varying the speed of the inflow pump. Preferably, the means for measuring the weight of the reactor tank includes a plurality of load cells for sensing the distribution of weight within the reactor tank. Preferably, in this aspect the fluidized bed pellet reactor further includes means for controlling the speed of the inflow pump. Preferably, in this aspect the fluidized bed pellet reactor further includes means for measuring the height of the fluidized bed within the reactor tank, such as an acoustic sensing device. Preferably, in this aspect the means for providing fine sand includes a sand storage tank and means for delivering sand from the sand storage tank to the reactor tank, such as a feed pump. Preferably, in this aspect the means for providing reagent to the reactor tank includes a reagent storage tank and means for delivering reagent from the reagent storage tank to the reactor tank, such as a feed or metering pump.

In another aspect, the present invention provides a fluidized bed pellet reactor for softening hard water. In this aspect, the reactor comprises a seed storage tank for storing fine sand for use as crystallization seeds, a reactor tank for containing a fluidized bed of pellets, an inflow pump for pumping inflow fluid to be treated into the reactor tank to fluidize the bed of pellets, a reagent storage tank for storing a chemical reagent for adjusting the pH of the fluid in the reactor tank, means for delivering seed from the seed storage tank to the reactor tank, means for delivering reagent from the reagent storage tank to the reactor tank, means for withdrawing treated water as an effluent from the reactor tank, means for withdrawing pellets from the reactor tank, and means for measuring the weight of the reactor tank and the contents of the reactor tank. In one presently preferred embodiment, the fluidized bed pellet reactor further includes a baffle positioned at the top of the reactor tank for limiting the outflow of effluent from the reactor tank. Preferably, the fluidized bed pellet reactor of the present invention further includes means for measuring the weight of the seed storage tank and the contents of the seed storage tank. Preferably, the fluidized bed pellet reactor of the present invention further includes means for adjusting the height of the fluidized bed. Preferably, the fluidized bed pellet reactor of the present invention further includes means for measuring the weight of the reagent tank and the contents of the reagent tank. Preferably, in another aspect, the means for measuring the weight of the reactor tank includes a plurality of load cells for sensing the distribution of weight within the reactor tank. Preferably, the fluidized bed pellet reactor of the present invention further includes means for controlling the speed of the inflow pump. Preferably, the fluidized bed pellet reactor of the present invention further includes means for measuring the height of the fluidized bed within the reactor tank.

The present invention also provides a process for softening water. The process includes providing a fluidized bed pellet reactor for softening hard water. The reactor preferably includes a seed storage tank for storing fine sand for use as crystallization seeds, a reactor tank for containing a fluidized bed of pellets, an inflow pump for pumping inflow fluid to be treated into the reactor tank to fluidize the bed of pellets, a reagent storage tank for storing a chemical reagent for adjusting the pH of the fluid in the reactor tank, means for delivering seed from the seed storage tank to the reactor tank, means for delivering reagent from the reagent storage tank to the reactor tank, means for withdrawing pellets from the reactor tank, and means for measuring the weight of the reactor tank and the contents of the reactor tank. The process further includes mixing a predetermined weight of seed with a predetermined volume or weight of water in the seed storage tank to form a mixture of seed and water; filling the reactor tank with a predetermined volume of water; transferring a predetermined amount of the mixture of seed and water from the seed storage tank to the reactor tank; pumping inflow liquid including calcium ion to be treated into the reactor tank to create a fluidized bed; delivering reagent from the reagent storage tank to the reactor tank to crystallize the calcium ion as calcium carbonate on the seed to form pellets; maintaining the density of the fluidized bed at a predetermined optimum density; withdrawing treated water as an effluent from the reactor tank; withdrawing pellets from the reactor tank. Preferably, the process includes controlling the speed of the inflow pump to maintain the predetermined density of the fluidized bed. Preferably, the process further includes providing means for measuring the weight of the seed storage tank and the contents of the seed storage tank. Preferably, the process further comprises providing a hopper for receiving pellets from the reactor, the hopper including means for measuring the weight of the hopper, permitting gravity dewatering of the pellets received from the reactor, and monitoring the loss of weight of the pellets as the pellets are dewatered. Preferably, the process wherein the means for measuring the weight of the reactor tank includes a plurality of load cells for sensing the distribution of weight within the reactor tank, the process further comprises sensing the distribution of weight of the contents of the reactor tank and comparing the sensed distribution of weight with a predetermined distribution. Preferably, the process further comprises delivering seed/sand to the seed storage tank; determining the weight of the seed/sand in the storage tank; delivering water to the seed storage tank; and measuring the weight of the water in the storage tank, wherein the water and sand are delivered in quantities sufficient to achieve a predetermined ratio of sand to water.

DETAILED DESCRIPTION

Figure 1:
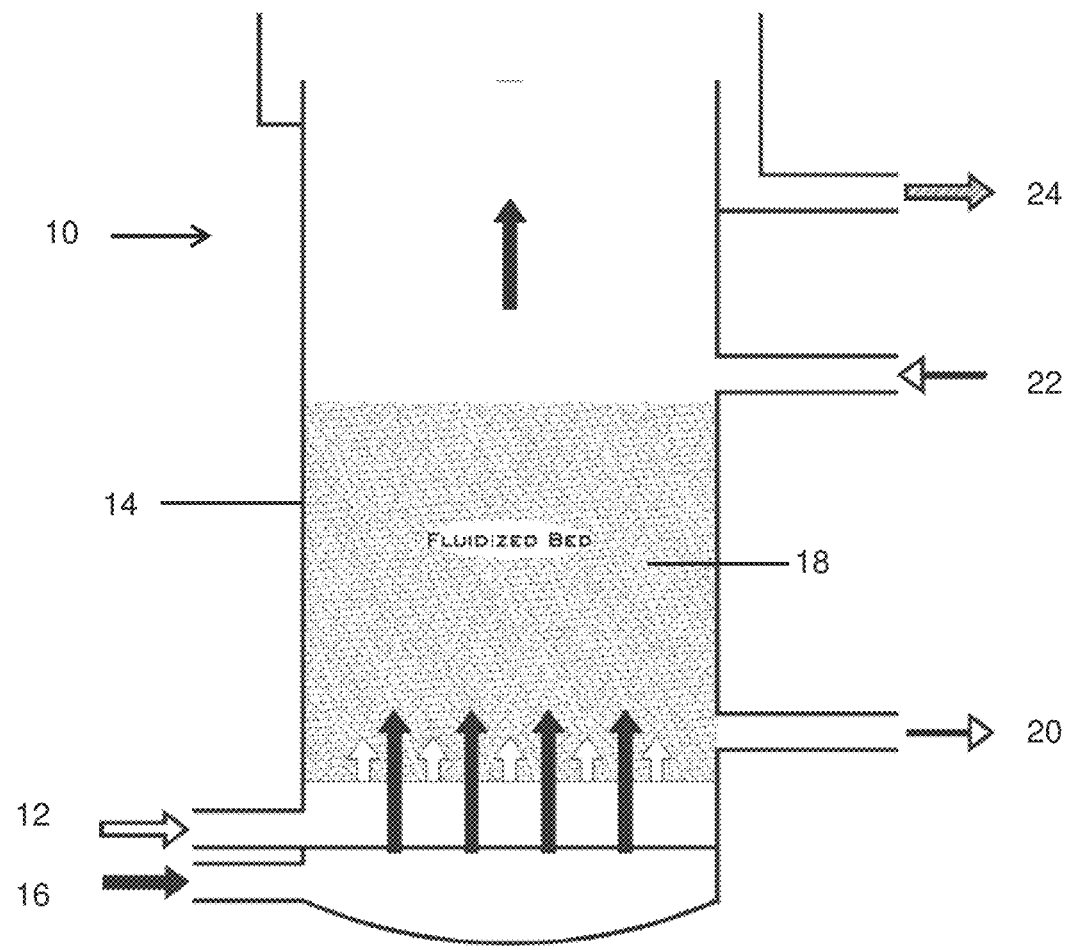
FIG. 1 is a schematic representation of a fluidized bed pellet reactor of the prior art.

Referring now to the figures in which like reference numerals represent like elements in each of the several views, there is shown in FIG. 1, a schematic representation of a fluidized bed pellet reactor 10 of the prior art, commonly referred to as an "Amsterdam" reactor. An influx flow 12 of water to be treated is pumped into the bottom of a generally vertical reactor tank 14. The water flows upward in the tank 14 in the direction shown by the arrows. At the same time, a basic reagent 16 such as sodium hydroxide or sodium carbonate is pumped into the bottom of the tank 14 and dispersed in the upward flow of the influx water. Seed or fine sand 22 is admitted into the tank 14 and is suspended in the tank 14 by the upward flow of the water in the tank 14, forming a fluidized bed. Calcium ions dissolved in the upflowing, basic, water precipitate or crystallize on the seeds, thus removing dissolved calcium to "soften" the water and forming pellets The softened water, or treated effluent 24, is discharged from the upper portion of the tank 14. Periodically, the largest pellets, which tend to settle to the bottom of the tank 14, are discharged 18 from the reactor 10 and recycled for industrial or agricultural purposes.

Figure 2:
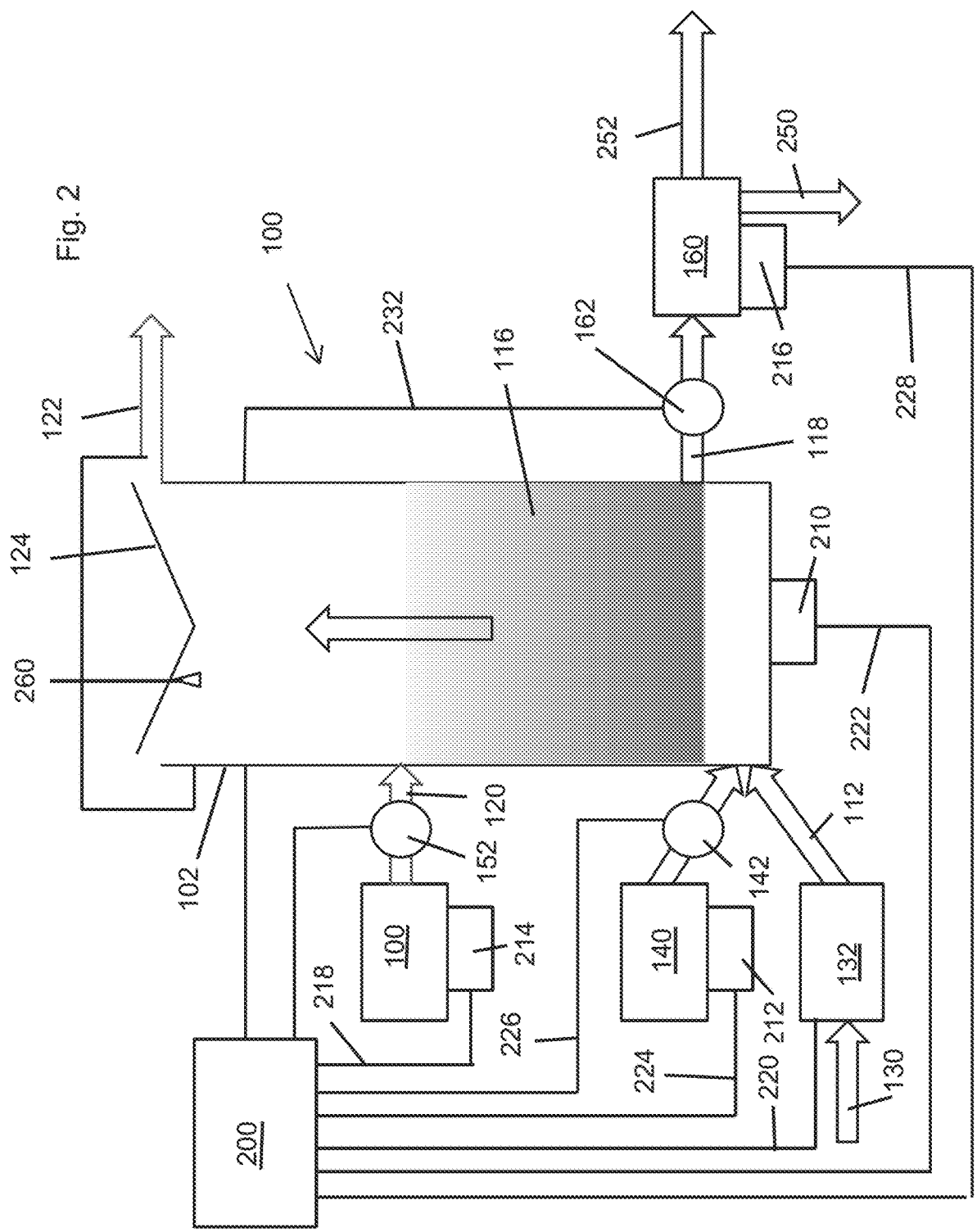
FIG. 2 is a schematic representation of a fluidized bed pellet reactor of the present invention.

FIG. 2 is a schematic representation of fluidized bed pellet reactor 100 of the present invention for carrying out the process of the present invention. The pellet reactor 100 includes a generally vertical reactor tank 102 for containing the fluidized bed 116. The flow of influent water 112 to be treated is provided near the bottom of the tank 102 by an influent pump 132 from calcium ion containing water 130 delivered from an external source. A chemical reagent or reactant such as sodium hydroxide or sodium carbonate is stored in a reagent storage tank 140 and delivered to the reactor tank 102 near the bottom thereof by suitable means such as by reagent metering or dosing pump 142. Seed or fine sand mixed with water is stored in a seed storage tank 150 and the mixture is delivered 120 to the reactor tank 102 at a predetermined elevation above the bottom of the reactor tank 102. Seed inflow 120 is controlled by suitable means 152, such as by a valve, a metering or dosing pump, or by some combination thereof. As the seed enters the basic upward flow of the calcium ion containing water to be treated, calcium carbonate precipitates or crystallizes on the surface of the seed, forming pellets composed largely of calcium carbonate. The pellets so formed are periodically discharged 118 from the bottom of the reactor tank 102 and stored in a pellet hopper 160 where water 250 is permitted to drain from the wet pellets. Pellet removal is controlled by suitable means 162, such as by a valve or pump, or a combination of the two. Treated effluent 122 is discharged from the upper end of the reactor tank 102 through an outflow pipe, outflow valve, or other suitable means. A baffle 124 is provided at or near the upper end or top of the reactor tank to limit the surface area of the top of the reactor tank 102 so as to limit the rise rate of the fluidized bed 116 in the reactor tank 102. Preferably, a device 260 for sensing the height of the fluidized bed 116 in the reactor tank 102 is provided, such as an acoustic, magnetostrictive or like device.

Operation of the pellet reactor 100 is preferably controlled by a central controller, which can be a specialized controller or a general purpose computer 200. The reactor tank 102 is provided by one or more load cells 210 which are connected to the computer 200 by one or more suitable sensing lines 222, such that the weight of the reactor tank 102 can be monitored continuously as the reactor tank 102 is filled with influent 112, reagent 114, and seed 120, and as pellets are formed on the seed, thus permitting the weight/or and density of the fluidized bed 116 within the reactor to be monitored. Preferably, the turbidity and/or total hardness of the effluent are also monitored (not shown), so that the input parameters, the input pump speed, rate of reagent addition, and rate and quantity of seed addition can be adjusted to provide a desired level of hardness reduction while minimizing release of particulate fines in the effluent which must be subsequently removed, such as by filtration.

The height of the fluidized bed 116 in the reactor tank 102 can be monitored and measured by a scale of suitable means, for example, acoustically. The average density of the fluidized bed 116 can be calculated based upon weight and volume.

The inflow pump 132 can be controlled by the computer 200 through a suitable control line. The speed of the inflow pump 132 can be varied and/or a valve can be used to adjust the pumping rate (not shown).

The computer 200 can optionally monitor the weight of the seed storage tank 150 by suitable means such as one or more load cells 214 through a suitable sensor line 218. Thus, seed storage tank 150 can be tared, and as water and seed/sand are sequentially added to the seed storage tank 150, the weight ratio of the two can be calculated, and the amount of seed/sand/water 120 delivered to the reactor tank 102 can be monitored.

The computer 200 can optionally also monitor the weight of the reagent storage tank 140 (and thus the weight of the reagent) by suitable means such as by one or more load cells 212 and corresponding sensing line 224, and control operation of the means for delivering reagent 142 (i.e. the valve or metering pump) to the reactor tank 102 through a suitable control line 226. Thus, the rate at which reactant 114 is delivered to the reactor tank 102 can be optimized to maximize the removal of dissolved calcium from the influent water 112.

Examples of reagents that can be employed in the process of the present invention include $Ca(OH)_2$ slurry; quicklime, hydrated lime, sodium hydroxide, soda ash, calcium sulfate, lime-soda ash, and caustic soda. In addition, sundry additives can be includes, and the seed bed or a portion of the seed bed can be recirculated.

In addition, the weight of the pellet hopper 160 is sensed by one or more load cells 216 and then provided to the computer 200 through sensor line 228. After wet pellets have been discharged from the reactor tank 102, drying of the pellets can be monitored as the sensed weight of the pellets declines as water 250 drains from the pellet hopper 160, and the dried pellets 252 can be thus discharged from the pellet hopper 160 when a predetermined level of dryness has been obtained. Discharge of pellets from the reactor tank 102 can be controlled by any suitable means, such as by a valve 162. Operation of the valve 162 can be controlled by the computer 200 through a control line 232. The dried pellets can be transferred, for example, by a conveyor, to storage bins, for later transfer to trucks, for example. The pellets can be processed, stored in storage bins, and discarched into trucks for remote transport, such as disclosed, for example, in U.S. Pat. Nos. 6,698,766, and 8,682,477, the entire disclosures of which are incorporated herein by reference.

Figure 3:
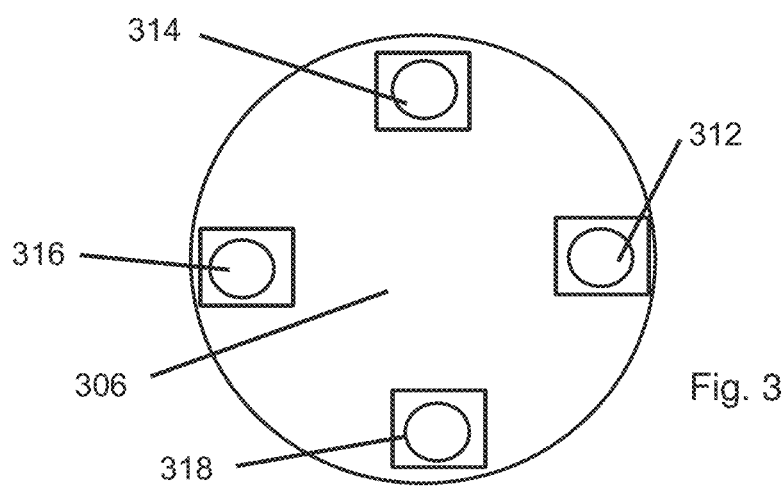
FIG. 3 is a fragmentary schematic bottom plan view of a reactor tank according to one presently preferred aspect of the present invention.

In another presently preferred embodiment of the present invention, a plurality of load cells 310, 312, 314, 316 (FIG. 3) are provided under the supporting legs of the reactor tank 306, so that the distribution of the weight of the fluidized bed in the reactor tank 306 can be monitored, and a distribution deviating from uniform can be corrected.

Figure 4:
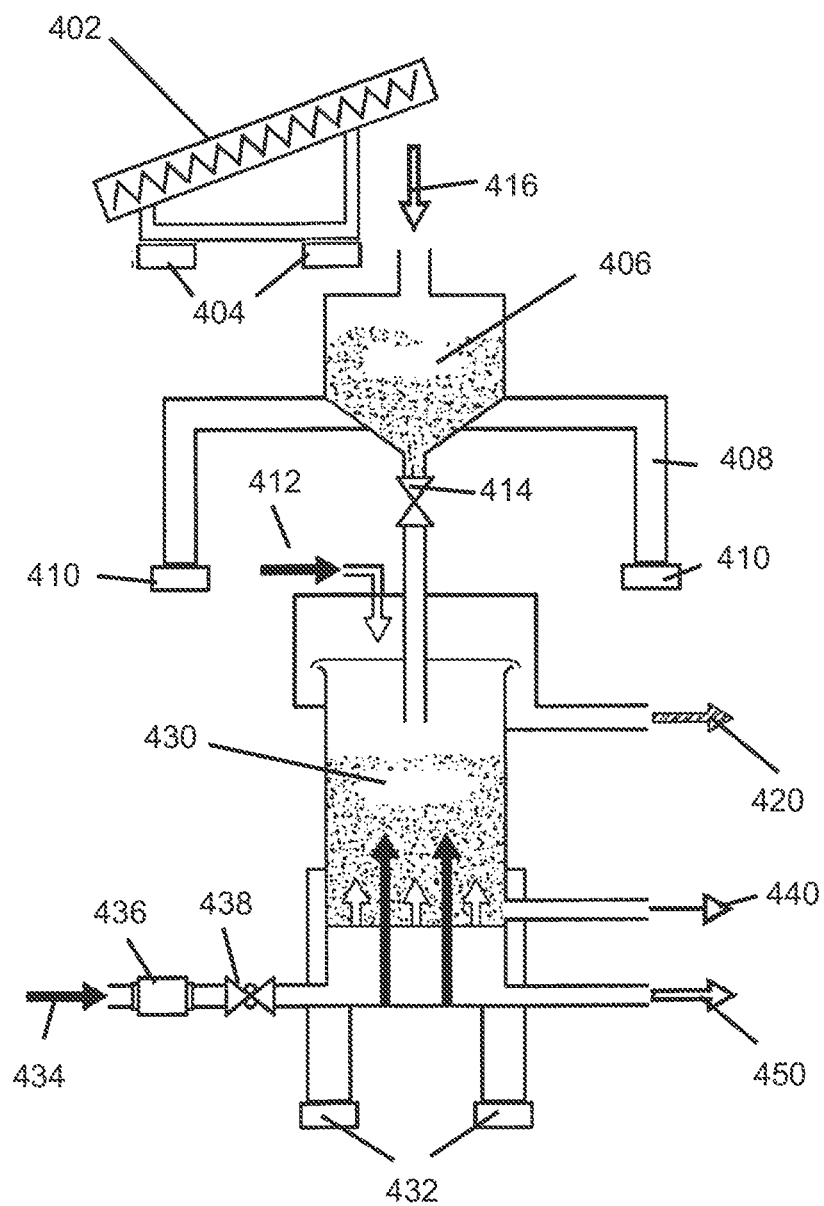
FIG. 4 is a schematic elevational view of a sand cleaning subsystem for preparing seed for use in the present invention.

Seed sand for use in the process of the present invention can be prepared using a suitable subsystem 400, such as illustrated in FIG. 4. In the process and apparatus of the subsystem 400, sand which may have various contaminants, is transferred from a suitable store (not shown) by a conveyor 402 equipped with load cells 404 for measuring the weight of sand being transported by the conveyor 402, and delivered to a hopper 406, which is supported by a plurality of legs 408, and which are also provided with load cells 410 for monitoring the weight of sand delivered to be washed. Sand is discharged through a flow-control valve 414 to an agitator or agitation tank 430, which is supplied proximate the bottom of the agitation tank 430 with clean wash water 434 through a modulating valve 438 for controlling the rate of flow of the clean water into the tank. The rate of flow of clean water into the agitation tank 430 is monitored with a flow meter 436. As the clean water flows upwards through sand in the agitation tank 430, impurities are removed, and the resulting dirty water is removed through an outlet 420 at the top of the agitation tank 430. As need be, clean water 412 can be supplied to the agitation tank 430 near the top of the agitation tank 430 to clean the agitation tank 430, and the resulting dirty water can be discharged through a tank drain 450 at the bottom of the tank. Clean seed sand 440 can be discharged through a valve near the bottom of the agitation tank 430.

Various modifications can be made in the details of the various embodiments of the apparatus and process of the present invention, all within the scope and spirit of the invention and defined by the appended claims.

The invention claimed is:

1. A fluidized bed pellet reactor for softening hard water, the reactor comprising: a reactor tank for containing a fluidized bed of pellets; means for providing fine sand for use as crystallization seeds to the reactor tank; an inflow pump for pumping inflow fluid to be treated into the reactor tank to fluidize the bed of pellets; means for providing reagent to the reactor tank for adjusting the pH of the fluid in the reactor tank; means for withdrawing treated water as an effluent from the reactor tank; means for withdrawing pellets from the reactor tank; and means for measuring the weight of the reactor tank and the contents of the reactor tank, wherein the means for measuring the weight of the reactor tank includes a plurality of load cells for sensing the distribution of weight within the reactor tank.

2. The fluidized bed pellet reactor according to claim 1 further including a baffle positioned at the top of the reactor tank for limiting the outflow of effluent from the reactor tank.

3. The fluidized bed pellet reactor according to claim 1 wherein the means for providing fine sand includes means for measuring the weight of the fine sand provided.

4. The fluidized bed pellet reactor according to claim 1 wherein the means for providing reagent includes means for measuring the weight of the reagent provided.

5. The fluidized bed pellet reactor according to claim 1 further comprising means for transporting pellets withdrawn from the reactor tank to a means for storing the pellets.

6. The fluidized bed pellet reactor according to claim 1 further including means for adjusting the height of the fluidized bed.

7. The fluidized bed pellet reactor according to claim 1 further including means for controlling the speed of the inflow pump.

8. The fluidized bed pellet reactor according to claim 1 further including means for measuring the height of the fluidized bed within the reactor tank.

9. The fluidized bed pellet reactor according to claim 1 wherein the means for providing fine sand includes a sand storage tank and means for delivering sand from the sand storage tank to the reactor tank.

10. The fluidized bed pellet reactor according to claim 1 wherein the means for providing reagent to the reactor tank includes a reagent storage tank and means for delivering reagent from the reagent storage tank to the reactor tank.

* * * * *